United States Patent
Wu et al.

(10) Patent No.: US 11,941,526 B2
(45) Date of Patent: Mar. 26, 2024

(54) METHODS, ELECTRONIC DEVICES, AND COMPUTER-READABLE MEDIA FOR TRAINING, AND PROCESSING DATA THROUGH, A SPIKING NEURON NETWORK

(71) Applicant: LYNXI TECHNOLOGIES CO., LTD., Beijing (CN)

(72) Inventors: Zhenzhi Wu, Beijing (CN); Qikun Zhang, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/004,013

(22) PCT Filed: Dec. 28, 2021

(86) PCT No.: PCT/CN2021/141981
§ 371 (c)(1),
(2) Date: Dec. 30, 2022

(87) PCT Pub. No.: WO2022/148272
PCT Pub. Date: Jul. 14, 2022

(65) Prior Publication Data
US 2023/0196102 A1   Jun. 22, 2023

(30) Foreign Application Priority Data
Jan. 7, 2021  (CN) .......................... 202110018629.9

(51) Int. Cl.
*G06N 3/08* (2023.01)
*G06N 3/049* (2023.01)

(52) U.S. Cl.
CPC ............... *G06N 3/08* (2013.01); *G06N 3/049* (2013.01)

(58) Field of Classification Search
CPC ................................. G06N 3/08; G06N 3/049
See application file for complete search history.

(56) References Cited

U.S. PATENT DOCUMENTS
2010/0287124 A1   11/2010 Nugent

FOREIGN PATENT DOCUMENTS
CN    106875005 A    6/2017
CN    109871940 A    6/2019
(Continued)

OTHER PUBLICATIONS

Lee et al. "Training deep spiking neural networks using Backpropagation", frontiers in Neuroscience, 2014, p. 13.*
(Continued)

*Primary Examiner* — Li Wu Chang
(74) *Attorney, Agent, or Firm* — BROWDY AND NEIMARK, P.L.L.C.

(57) ABSTRACT

Provided is a method for training spiking neuron network, including: inputting a spiking signal corresponding to a training sample into a spiking neuron network to be trained; and training the spiking neuron network based on a back propagation rule, wherein a forward propagation stage of training includes: adjusting a spiking firing threshold corresponding to a target layer in the spiking neuron network according to confidence corresponding to the target layer. Also provided are a method for processing data based on a spiking neuron network, an electronic device, and a non-transitory computer-readable medium.

16 Claims, 5 Drawing Sheets

(56) References Cited

FOREIGN PATENT DOCUMENTS

| CN | 110826602 A | 2/2020 | | |
|---|---|---|---|---|
| CN | 111639754 A | 9/2020 | | |
| CN | 112734012 A | 4/2021 | | |
| WO | WO-2021143066 A1 * | 7/2021 | ........... | G06N 3/0454 |

OTHER PUBLICATIONS

Diehl et al. "Fast and efficient information transmission with burst spikes in deep spiking neural networks", IJCNN, 2015, pp. 8.*
Sengupta et al. "Going Deeper in Spiking Neural Networks: VGG and Residual Architectures", frontiers, 2019, pp. 16.*

* cited by examiner

METHODS, ELECTRONIC DEVICES, AND COMPUTER-READABLE MEDIA FOR TRAINING, AND PROCESSING DATA THROUGH, A SPIKING NEURON NETWORK

CROSS-REFERENCE TO RELATED APPLICATIONS

The present application is a National Phase Application filed under 35 U.S.C. 371 as a national stage of PCT/CN2021/141981, filed on Dec. 28, 2021, an application claiming priority from Chinese Patent Application No. 202110018629.9, filed on Jan. 7, 2021 in the Chinese Intellectual Property Office, contents of which are hereby incorporated herein by reference in their entirety.

TECHNICAL FIELD

The present disclosure relates to the field of computer technology, and more particularly, to a method for training spiking neuron network (SNN), a method for processing data based on SNN, an electronic device, and a computer-readable medium.

BACKGROUND ART

Compared with traditional neuron networks, an SNN is widely used in many fields such as pattern recognition, image processing and computer vision because the bionic design of SNN is closer to the reality. At present, when training using a back propagation (BP) rule, the sparsity of the SNN will be prone to vanishing gradients or exploding gradients in the training process thereof, thus making it difficult to train based on this rule.

SUMMARY OF THE INVENTION

The present disclosure provides an SNN training method, an SNN-based data processing method, an electronic device, and a computer-readable medium.

According to a first aspect, the present disclosure provides a method for training SNN, including:

inputting a spiking signal corresponding to a training sample into an SNN to be trained; and training the SNN based on a BP rule, wherein a forward propagation stage of training includes: adjusting a spiking firing threshold corresponding to a target layer in the SNN according to confidence corresponding to the target layer.

According to a second aspect, the present disclosure provides a method for processing data based on SNN, including:

acquiring a spiking signal corresponding to data to be processed; and processing the spiking signal through an SNN, and outputting a processing result, wherein the processing includes: adjusting a spiking firing threshold corresponding to a target layer in the SNN according to confidence corresponding to the target layer, the SNN being obtained by training based on the above SNN training method.

According to a third aspect, the present disclosure provides an electronic device, including:

one or more processors; and a memory configured to store one or more computer instructions.

When the one or more computer instructions are executed by the one or more processors, the one or more processors implement the above SNN training method, and/or, implement the SNN-based data processing method.

According to a fourth aspect, the present disclosure provides a computer-readable medium having a computer program stored thereon. The computer program, when executed by a processor, implements the steps in the above SNN training method, and/or, implements the steps in the SNN-based data processing method.

It should be understood that the content described in this section is not intended to identify key or critical features of embodiments of the present disclosure, nor is it intended to limit the scope of the present disclosure. Other features of the present disclosure will become apparent from the following description.

BRIEF DESCRIPTION OF THE DRAWINGS

The accompanying drawings, which are used to provide a further understanding of the present disclosure and constitute a part of the description, serve to explain the present disclosure together with the embodiments of the present disclosure, and are not to be construed as limiting the present disclosure. The above and other features and advantages will become more apparent to those skilled in the art by describing in detail exemplary embodiments thereof with reference to the accompanying drawings in which.

DETAILED DESCRIPTION OF THE INVENTION

In order that those skilled in the art may better understand the technical solution of the present disclosure, exemplary embodiments of the present disclosure are described below with reference to the accompanying drawings, where various details of the embodiments of the present disclosure are included to facilitate understanding, which should be considered exemplary only. Accordingly, those ordinarily skilled in the art will recognize that various changes and modifications may be made to the embodiments described herein without departing from the scope and spirit of the present disclosure. Also, descriptions of well-known functions and constructions are omitted from the following description for clarity and conciseness.

The various embodiments of the present disclosure and the various features in the embodiments may be combined with each other without conflict.

As used herein, the term "and/or" includes any and all combinations of one or more of the associated listed items.

The terms used herein are for the purpose of describing particular embodiments only and are not intended to be limiting to the present disclosure. As used herein, the singular forms "a/an" and "the" are intended to include the plural forms as well, unless the context clearly indicates otherwise. It should be further understood that the terms "including" and/or "made of . . . " when used in this description, specify the presence of the features, integers, steps, operations, elements, and/or components, but do not preclude the presence or addition of one or more other features, integers, steps, operations, elements, components, and/or groups thereof. "Connection" or "connected" and like terms are not limited to physical or mechanical connections but may include electrical connections, whether direct or indirect.

Unless otherwise defined, all terms (including technical and scientific terms) used herein have the same meaning as commonly understood by those ordinarily skilled in the art. It should be further understood that terms, such as those defined in commonly used dictionaries, should be interpreted as having a meaning that is consistent with the meaning in the context of the related art and the present disclosure, and will not be interpreted in an idealized or overly formal meaning unless expressly so defined herein.

Figure 1:
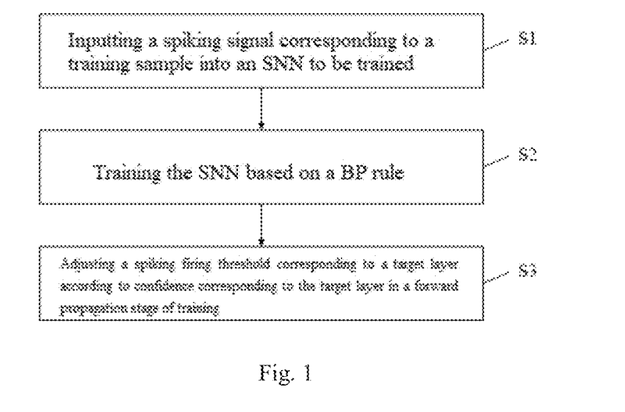
FIG. 1 is a flowchart of an SNN training method according to an embodiment of the present disclosure.

FIG. 1 is a flowchart of an SNN training method according to an embodiment of the present disclosure. The SNN training method may be applied to an electronic device. The electronic device may perform the SNN training method by carrying a software system corresponding to the SNN training method. Exemplarily, the type of the electronic device may be a notebook computer, a computer, a server, a mobile phone, a tablet computer (PAD), etc, and is not particularly limited in the embodiments of the present disclosure.

It should be understood that the SNN training method may be performed by a terminal device or a server device separately or by a terminal device and a server-side device cooperatively.

For example, the SNN training method may be integrated into a client. After receiving an SNN training request, a terminal device carrying the client may perform the SNN training method through a hash rate provided by a hardware environment of the terminal device.

For example, the SNN training method may be integrated into a system platform. After receiving an SNN training request, a server device carrying the system platform may perform the SNN training method through a hash rate provided by the hardware environment of the server device.

For example, the SNN training method may be divided into two tasks: constructing training samples and performing network training based on training samples. The task of constructing training samples may be integrated into the client and carried on the terminal device. The task of network training may be integrated into the server and carried on the server device. The above terminal device may initiate an SNN training request to the above server device after constructing a training sample. After receiving the SNN training request, the server device may perform, in response to the training request, network training on an SNN based on the training sample.

As shown in FIG. 1, embodiments of the present disclosure provide an SNN training method. The SNN training method may be implemented based on the above electronic device. The SNN training method may include the following steps S1 to S3.

At step S1, a spiking signal corresponding to a training sample is input into an SNN to be trained.

The spiking signal corresponding to the training sample is a spiking signal generated according to the training sample. In some embodiments, the training sample is in the form of a spiking signal, or the spiking signal may be generated by performing spiking coding on an original training sample. The spiking signal may be in the form of a spiking sequence.

In some embodiments, the spiking signal corresponding to the training sample includes an image spiking sequence corresponding to an image sample, an audio spiking sequence corresponding to an audio sample, and a text spiking sequence corresponding to a text sample. In some embodiments, the spiking signal corresponding to the training sample may also include video spiking sequences corresponding to video samples, and spiking signals corresponding to feature maps, feature points, and other feature information, etc. Accordingly, the SNN may be configured to perform any one of image processing tasks, speech processing tasks, text processing tasks, and video processing tasks.

In some embodiments, a neuron model of the SNN adopts a leaky integrate-and-fire (LIF) model.

In some embodiments, before the inputting a spiking signal corresponding to a training sample into an SNN to be trained, the method further includes: initializing various network parameters of the SNN. The various network parameters of the SNN may include a synaptic weight, an activation parameter, etc.

At step S2, the SNN is trained based on a BP rule.

The BP rule includes a forward propagation stage and a BP stage. In the forward propagation stage, the SNN performs forward propagation calculation reasoning on the input spiking signal corresponding to the training sample to obtain an actual output value. In the BP stage, BP is performed according to an error between the actual output value and an expected output value of the forward propagation stage. The forward propagation stage and the BP stage are cyclically iterated in such a way as to carry out a learning training of the network parameters of the SNN.

After training, the SNN may be configured to realize various functions, such as target detection, behavior recognition, image processing, speech processing, text processing, video processing, etc. When training the SNN, corresponding training samples, such as image feature information and image sequence, are selected according to the functions to be realized. Regardless of a function to be specifically realized by the SNN, the SNN may be trained by using the method provided by the present disclosure to realize the corresponding functions.

In some embodiments, the BP rule is a back propagation through time (BPTT) algorithm.

At step S3, a spiking firing threshold corresponding to a target layer is adjusted according to confidence corresponding to the target layer in a forward propagation stage of training.

In the embodiments of the present disclosure, the target layer is any network layer in the SNN to be trained. The target layer may include a plurality of neurons. The confidence corresponding to the target layer is associated with an expected spiking firing sparsity of the target layer. The spiking firing sparsity is a ratio of the number of neurons firing spiking in the target layer to the number of all neurons in the target layer. The confidence may be configured offline in advance.

In the embodiments of the present disclosure, the spiking firing threshold corresponding to the target layer refers to a threshold value for spiking firing by a neuron in the target layer. For example, when an activation parameter corresponding to the neuron in the target layer reaches the threshold value, the neuron performs spiking firing. The activation parameter may be determined according to the membrane potential of the neuron.

It should be noted that the above description on the manner in which the confidence is configured is merely a specific implementation provided by the embodiments of the present disclosure, which does not limit the technical solution of the present disclosure. The confidence corresponding to the target layer may be flexibly set. Other confidence acquisitions and setting modes are also applicable to the technical solution of the present disclosure.

In some embodiments, the confidence corresponding to the target layer is associated with an expected firing rate of the target layer. The sum of the confidence and the expected firing rate is equal to 1. In some embodiments, the spiking firing threshold may be adjusted based on a comparison result of a firing rate of the target layer with the expected firing rate. The relevant descriptions have been introduced in detail below and will be omitted herein. The firing rate of the target layer characterizes a current spiking firing situation of the target layer. Exemplarily, the firing rate of the target layer is a ratio of the number of neurons currently firing spiking in the target layer to the number of all neurons in the target layer.

The embodiments of the present disclosure provide an SNN training method. According to this method, when an SNN is trained based on a BP rule, a spiking firing threshold of a target layer is adjusted according to confidence corresponding to the target layer in a forward propagation stage of training, whereby the SNN can adaptively adjust the spiking firing threshold when trained based on the BP rule, so as to effectively improve the phenomenon of vanishing gradients or exploding gradients during the training, and improve the efficiency and effect of network training. Moreover, in the process of SNN training and reasoning through the SNN obtained by training, by adjusting the spiking firing threshold, the spiking firing sparsity of the target layer can be maintained within a target range, thereby improving the calculation efficiency of the SNN.

Figure 2:
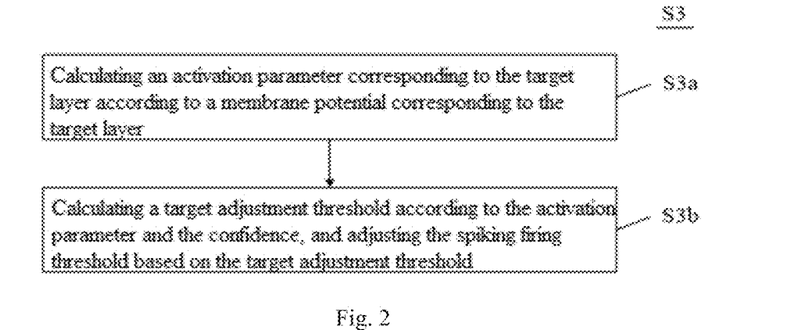
FIG. 2 is a flowchart of a specific implementation method of step S3 according to an embodiment of the present disclosure.

FIG. 2 is a flowchart of a specific implementation method of step S3 according to an embodiment of the present disclosure. As shown in FIG. 2, in some embodiments, in step S3, the operation of adjusting a spiking firing threshold corresponding to a target layer according to confidence corresponding to the target layer may further include the following steps S3a and S3b.

At step S3a, an activation parameter corresponding to the target layer is calculated according to a membrane potential corresponding to the target layer.

In some embodiments, for the target layer, a membrane potential hidden state corresponding to the target layer is calculated according to the output of a forward layer of the target layer, based on the spiking signal corresponding to the training sample input in step S1. The forward layer of the target layer refers to a previous network layer of the target layer in the SNN, and the output of the forward layer of the target layer is connected to the input of the target layer.

Exemplarily, the following formula may be adopted: $h_{t,l}=W_{l-1} \square x_{t,l}+b_{l-1}$. A membrane potential hidden state $h_{t,l}$ corresponding to the target layer with a layer identifier of l is calculated. t is a current time step; $W_{l-1}$ is a weight, and $b_{l-1}$ is an offset term; $x_{t,l}$ is the input of the target layer, i.e. the output of the forward layer of the target layer, which may include a plurality of values.

Thereafter, a membrane potential corresponding to the target layer is calculated based on the membrane potential hidden state corresponding to the target layer.

Exemplarily, the following formula may be adopted: $v_{t,l}=h_{t,l}+\alpha \square v_{t-1,l}$. A membrane potential $v_{t,l}$ corresponding to the target layer is calculated. $\alpha$ represents a leakage parameter of the membrane potential; $\square$ represents a Hadamard product operation; $v_{t-1,l}$ represents a membrane potential corresponding to the target layer at the previous time step.

And an activation parameter corresponding to the target layer is calculated based on an activation function according to the membrane potential corresponding to the target layer. The activation parameter includes a plurality of values.

In some embodiments, the following formula may be adopted: $y_{t,l}=\sigma(v_{t,l}+\delta)$. An activation parameter t,l is calculated. $\sigma(\ )$ represents an activation function, which may be, for example, a custom function or a regularization function; $\delta$ represents a random activation coefficient, which may be, for example, a random noise.

It should be noted that the above description on the manner in which the activation function is calculated is merely a specific implementation provided by the embodiments of the present disclosure, which does not limit the technical solution of the present disclosure. Other activation function calculation modes are also applicable to the technical solution of the present disclosure. The membrane potential corresponding to the target layer may refer to a membrane potential of the neurons of the target layer, and the activation parameter corresponding to the target layer may refer to an activation parameter corresponding to the neurons of the target layer.

At step S3b, a target adjustment threshold is calculated according to the activation parameter and the confidence, and the spiking firing threshold is adjusted based on the target adjustment threshold.

In step S3b, a target adjustment threshold is calculated according to the activation parameter and the confidence, and the target adjustment threshold is used for characterizing the confidence in the form of a threshold, whereby the spiking firing threshold is adjusted based on the target adjustment threshold.

In some embodiments, an activation parameter including a plurality of values is sorted and a target adjustment threshold is calculated according to the sorting result and the confidence. In some embodiments, there is one confidence corresponding to the target layer, with a value of k %. The activation parameter values corresponding to the activation parameters are sorted in descending order, and based on the confidence k %, the activation parameter values at the previous (1-k)% in the sorting result are determined as the activation parameter values which may be fired or to be fired. Thus, the value of the target adjustment threshold is less than or equal to any of the activation parameter values at the previous (1-k)% and is greater than the remaining activation parameter values. That is, the value of the target adjustment threshold is less than or equal to the minimum value in the activation parameter values at the previous (1-k)% and is greater than the maximum value in the remaining activation parameter values. In some embodiments, in the presence of a plurality of confidences, based on the above manner of determining the target adjustment threshold, the value ranges of a plurality of target adjustment thresholds are obtained respectively by repeated calculation.

Accordingly, the determined target adjustment thresholds may have a plurality of values.

Figure 3:
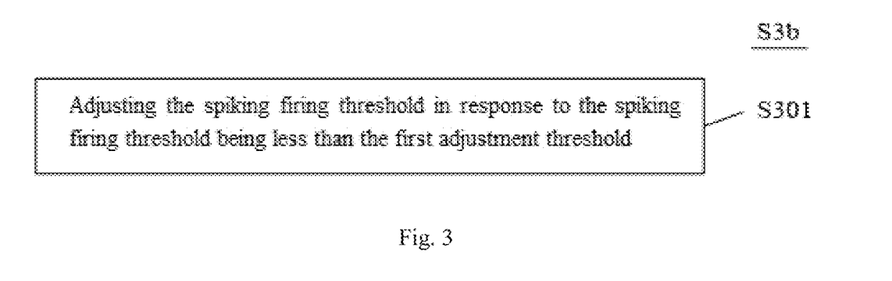
FIG. 3 is a flowchart of a specific implementation method of step S3b according to an embodiment of the present disclosure.

FIG. 3 is a flowchart of a specific implementation method of step S3b according to an embodiment of the present disclosure. As shown in FIG. 3, in some embodiments, the target adjustment threshold may include a first adjustment threshold. In step S3b, the operation of calculating a target adjustment threshold according to the activation parameter and the confidence and adjusting the spiking firing threshold based on the target adjustment threshold may further include the following step S301.

At step S301, the spiking firing threshold is adjusted in response to the spiking firing threshold being less than the first adjustment threshold.

In some embodiments, if the spiking firing threshold is less than the first adjustment threshold, it indicates that real-time confidence corresponding to the target layer is less than expected confidence, and a current firing threshold value, i.e. the spiking firing threshold, is too low. If the firing is determined based on this threshold value, there may be excessive spiking firing of the target layer, whereby the spiking firing threshold is adjusted to reduce the spiking firing of the target layer.

Figure 4:
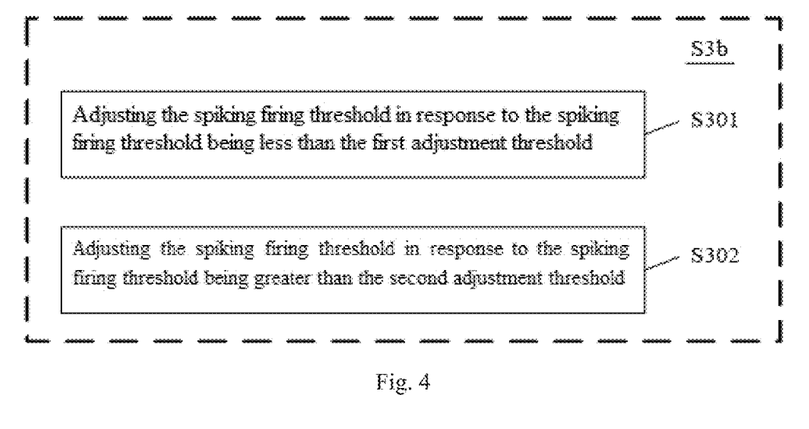
FIG. 4 is a flowchart of another specific implementation method of step S3b according to an embodiment of the present disclosure.

FIG. 4 is a flowchart of another specific implementation method of step S3b according to an embodiment of the present disclosure. As shown in FIG. 4, in some embodiments, the target adjustment threshold further includes a second adjustment threshold. That is, the target adjustment threshold includes a first adjustment threshold and a second adjustment threshold. Based on step S301, in step S3b, the operation of calculating a target adjustment threshold according to the activation parameter and the confidence and adjusting the spiking firing threshold based on the target adjustment threshold may further include the following step S302.

At step S302, the spiking firing threshold is adjusted in response to the spiking firing threshold being greater than the second adjustment threshold.

The second adjustment threshold is greater than the first adjustment threshold.

In some embodiments, if the spiking firing threshold is less than the first adjustment threshold, it indicates that real-time confidence corresponding to the target layer is less than expected minimum confidence, and a current firing threshold value, i.e. the spiking firing threshold, is too low. If the firing is determined based on this threshold value, there may be excessive spiking firing of the target layer, whereby the spiking firing threshold is adjusted to reduce the spiking firing of the target layer. If the spiking firing threshold is greater than the second adjustment threshold, it indicates that real-time confidence corresponding to the target layer is less than expected maximum confidence, and a current firing threshold value, i.e. the spiking firing threshold, is too high. If the firing is determined based on this threshold value, there may be insufficient spiking firing of the target layer, whereby the spiking firing threshold is adjusted to increase the spiking firing of the target layer. If the spiking firing threshold is greater than the second adjustment threshold or less than the first adjustment threshold, it indicates that the confidence corresponding to the target layer does not fall within an interval corresponding to expected confidence, and the spiking firing threshold needs to be adjusted so that the confidence falls within the interval, whereby the spiking firing sparsity of the target layer can be maintained within a target range, thereby improving the calculation efficiency of the SNN.

In some embodiments, in step S301, the first adjustment threshold is determined as the adjusted spiking firing threshold corresponding to the target layer in response to the spiking firing threshold being less than the first adjustment threshold.

Figure 5:
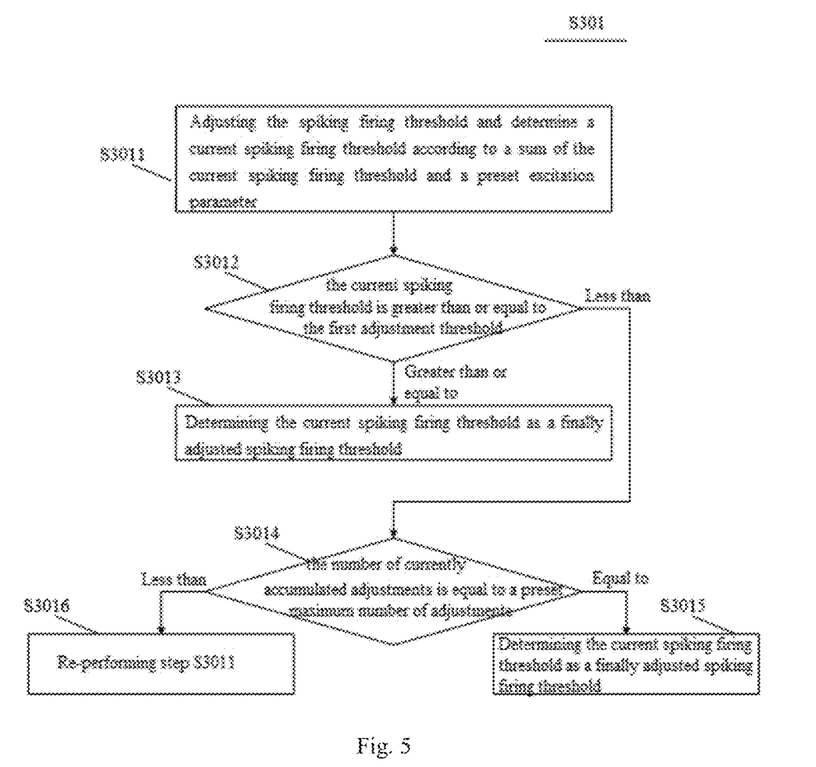
FIG. 5 is a flowchart of a specific implementation method of step S301 according to an embodiment of the present disclosure.

FIG. 5 is a flowchart of a specific implementation method of step S301 according to an embodiment of the present disclosure. As shown in FIG. 5, in some embodiments, the spiking firing threshold is adjusted by adaptive learning. In step S301, the operation of adjusting the spiking firing threshold in response to the spiking firing threshold being less than the first adjustment threshold may further include the following steps S3011 to S3016.

At step S3011, the spiking firing threshold is adjusted and a current spiking firing threshold is determined according to a sum of the current spiking firing threshold and a preset excitation parameter.

The excitation parameter is a preset adjustment base. At each adjustment, the current spiking firing threshold is determined according to the sum of the current spiking firing threshold and the excitation parameter. Exemplarily, at each adjustment, the sum of the current spiking firing threshold and the excitation parameter is determined as the current spiking firing threshold.

At step S3012, it is determined whether the current spiking firing threshold is greater than or equal to the first adjustment threshold.

At step S3013, the current spiking firing threshold is determined as a finally adjusted spiking firing threshold if the current spiking firing threshold is greater than or equal to the first adjustment threshold.

At step S3014, it is further determined whether the number of currently accumulated adjustments is equal to a preset maximum number of adjustments if the current spiking firing threshold is less than the first adjustment threshold.

Each time the spiking firing threshold is adjusted, the number of currently accumulated adjustments is incremented by 1.

At step S3015, the current spiking firing threshold is determined as a finally adjusted spiking firing threshold if the number of currently accumulated adjustments is equal to the preset maximum number of adjustments.

At step S3016, step S3011 is re-performed if the number of currently accumulated adjustments is less than the preset maximum number of adjustments.

In some embodiments, in step S302, the second adjustment threshold is determined as the adjusted spiking firing threshold corresponding to the target layer in response to the spiking firing threshold being greater than the second adjustment threshold.

Figure 6:
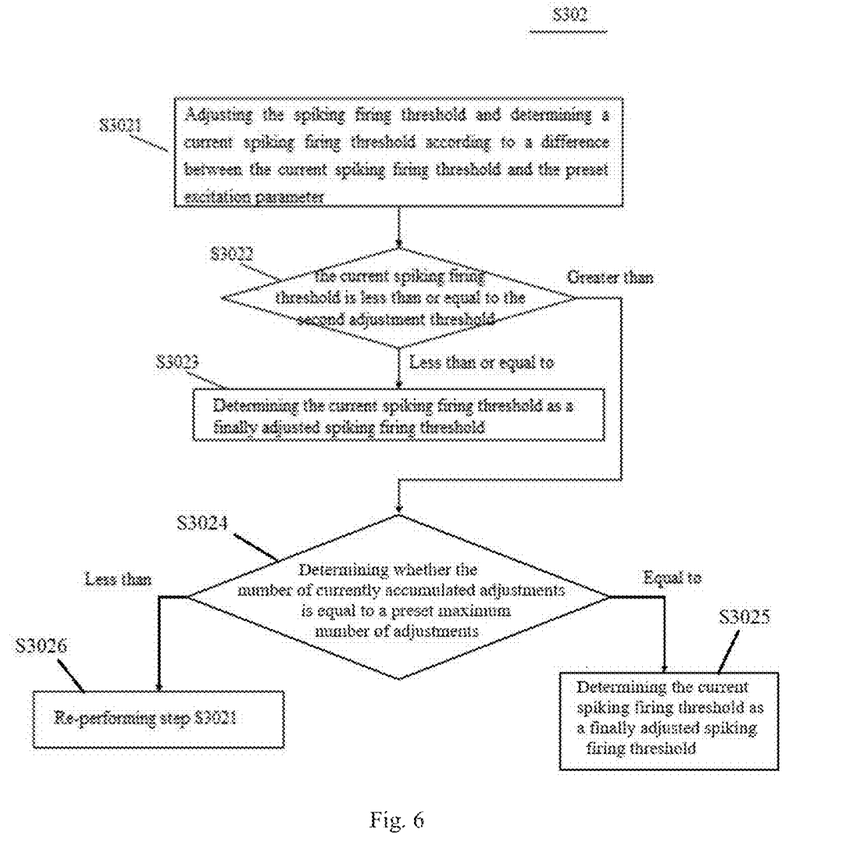
FIG. 6 is a flowchart of a specific implementation method of step S302 according to an embodiment of the present disclosure.

FIG. 6 is a flowchart of a specific implementation method of step S302 according to an embodiment of the present disclosure. As shown in FIG. 6, in some embodiments, the spiking firing threshold is adjusted by adaptive learning. In step S302, the operation of adjusting the spiking firing threshold in response to the spiking firing threshold being greater than the second adjustment threshold may further include the following steps S3021 to S3026.

At step S3021, the spiking firing threshold is adjusted and a current spiking firing threshold is determined according to a difference between the current spiking firing threshold and the preset excitation parameter.

The excitation parameter is a preset adjustment base. At each adjustment, the current spiking firing threshold is determined according to the difference between the current spiking firing threshold and the excitation parameter. Exemplarily, at each adjustment, the difference between the current spiking firing threshold and the excitation parameter is determined as the current spiking firing threshold.

At step S3022, it is determined whether the current spiking firing threshold is less than or equal to the second adjustment threshold.

Each time the spiking firing threshold is adjusted, the number of currently accumulated adjustments is incremented by 1.

At step S3023, the current spiking firing threshold is determined as a finally adjusted spiking firing threshold if the current spiking firing threshold is less than or equal to the second adjustment threshold.

At step S3024, it is further determined whether the number of currently accumulated adjustments is equal to a preset maximum number of adjustments if the current spiking firing threshold is greater than the second adjustment threshold.

At step S3025, the current spiking firing threshold is determined as a finally adjusted spiking firing threshold if the number of currently accumulated adjustments is equal to the preset maximum number of adjustments.

At step S3026, step S3021 is re-performed if the number of currently accumulated adjustments is less than the preset maximum number of adjustments.

It should be noted that the respective implementations of step S3011 and step S3021 are only one specific implementation provided by the embodiments of the present disclosure. That is, there are also the following implementations: in some embodiments, step S3011 and step S3021 are performed in combination, and step S3011 and step S3021 respectively adjust the spiking firing threshold according to the same excitation parameter, or the excitation parameter has a plurality of values, and step S3011 and step S3021 respectively adjust the spiking firing threshold according to one of the values.

The embodiments of the present disclosure provide an SNN training method. The method may be used for converting confidence corresponding to a target layer into a target adjustment threshold, and directly adjusting a spiking firing threshold according to the comparison result between the target adjustment threshold and the spiking firing threshold, so as to realize adaptive adjustment of a spiking firing threshold value according to an actual spiking firing situation.

In some embodiments, before adjusting a spiking firing threshold corresponding to a target layer in the SNN according to confidence corresponding to the target layer in step S3, the method further includes: calculating an activation parameter corresponding to the target layer according to a membrane potential corresponding to the target layer.

And, in step S3, the operation of adjusting a spiking firing threshold corresponding to a target layer according to confidence corresponding to the target layer may further include: determining an average activation parameter according to the activation parameter corresponding to the target layer; and adjusting the spiking firing threshold according to the average activation parameter and the confidence.

Similar to step S3a, an activation parameter corresponding to the target layer may be calculated according to the membrane potential corresponding to the target layer. The detailed descriptions will be omitted herein.

An average activation parameter is determined according to the activation parameter corresponding to the target layer. In some embodiments, the following formula is adopted:

$$\overline{y} = \frac{\sum_{i=1}^{N} y_i}{N}.$$

An average activation parameter $\overline{y}$ is determined. The activation parameter includes a plurality of activation parameter values. $y_i$ represents an activation parameter value, $1 \leq i \leq N$, and N is the number of activation parameter values.

The spiking firing threshold is determined according to the average activation parameter and the confidence. In some embodiments, the confidence may be any one of 85% to 98%, and the product of the average activation parameter and the confidence may be used as the adjusted spiking firing threshold corresponding to the target layer.

In this way, the spiking firing threshold is adjusted adaptively according to the average activation parameter of the target layer and the confidence, and the firing rate of the target layer can be controlled within a target range effectively, thereby effectively reducing the occurrence of vanishing gradients or exploding gradients during training. Moreover, in the process of SNN training and reasoning through the SNN obtained by training, by adjusting the spiking firing threshold, the sparsity of the target layer can be maintained within a target range, thereby improving the calculation efficiency of the SNN.

Figure 7:
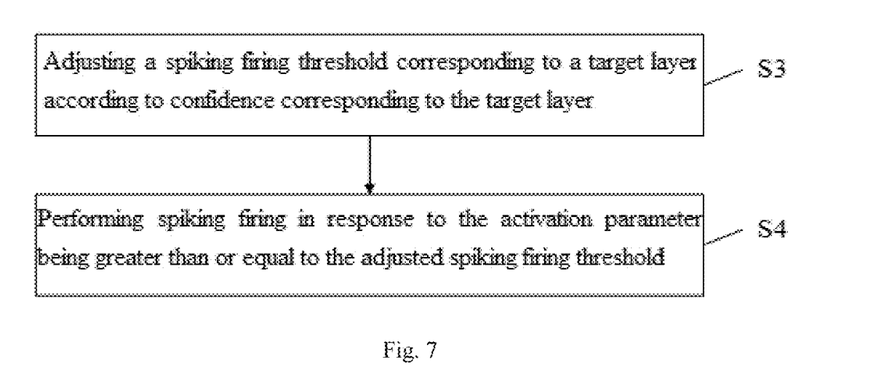
FIG. 7 is a flowchart of another SNN training method according to an embodiment of the present disclosure.

FIG. 7 is a flowchart of another SNN training method according to an embodiment of the present disclosure. As shown in FIG. 7, in some embodiments, in a forward propagation stage of training, after adjusting a spiking firing threshold corresponding to a target layer according to confidence corresponding to the target layer in step S3, the SNN training method further includes the following step S4. Only step S4 is described in detail below.

At step S4, spiking firing is performed in response to the activation parameter being greater than or equal to the adjusted spiking firing threshold.

After the spiking firing threshold of the target layer is adjusted according to the confidence, different from the solution of triggering spiking firing according to the membrane potential and the spiking firing threshold in the related art, in step S4, spiking firing is determined according to the activation parameter corresponding to the target layer and the adjusted spiking firing threshold, and spiking firing of the target layer is performed in response to the activation parameter corresponding to the target layer being greater than or equal to the adjusted spiking firing threshold. The activation parameter is activation value, which is the output of an activation function of the target layer.

In some embodiments, in the forward propagation stage of training, after step S4, a step of performing membrane potential leakage of the target layer and a step of adjusting the value range of the activation parameter according to a current value of the activation parameter and the adjusted spiking firing threshold are further included.

Figure 8:
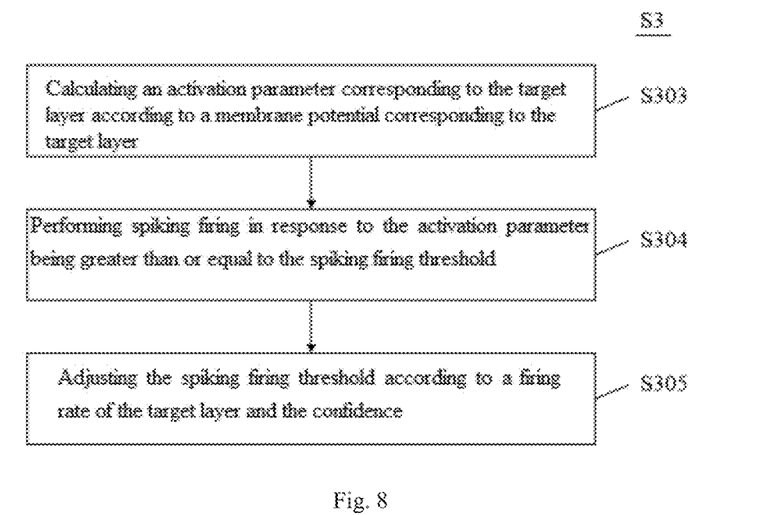
FIG. 8 is a flowchart of another specific implementation method of step S3 according to an embodiment of the present disclosure.

FIG. 8 is a flowchart of another specific implementation method of step S3 according to an embodiment of the present disclosure. As shown in FIG. 8, in some embodiments, in step S3, the operation of adjusting a spiking firing threshold corresponding to a target layer according to confidence corresponding to the target layer may further include the following steps S303 to S305.

At step S303, an activation parameter corresponding to the target layer is calculated according to a membrane potential corresponding to the target layer.

In some embodiments, a membrane potential hidden state is calculated according to the output of a forward layer of the target layer, a membrane potential corresponding to the target layer is calculated based on a hidden state parameter, and thereafter, an activation parameter corresponding to the target layer is calculated based on the activation function according to the membrane potential corresponding to the target layer. For the description of step S303, reference may be made to the above description of step S3a. The detailed descriptions will be omitted herein.

At step S304, spiking firing is performed in response to the activation parameter being greater than or equal to the spiking firing threshold.

At step S305, the spiking firing threshold is adjusted according to a firing rate of the target layer and the confidence.

In the implementation schemes of steps S303 to S305, different from the mode of adjusting and then firing based on the confidence in steps S3a, S3b and S4, the scheme firstly determines spiking firing for the target layer, and then adjusts the spiking firing threshold according to a real-time firing rate and confidence of the target layer.

Figure 9:
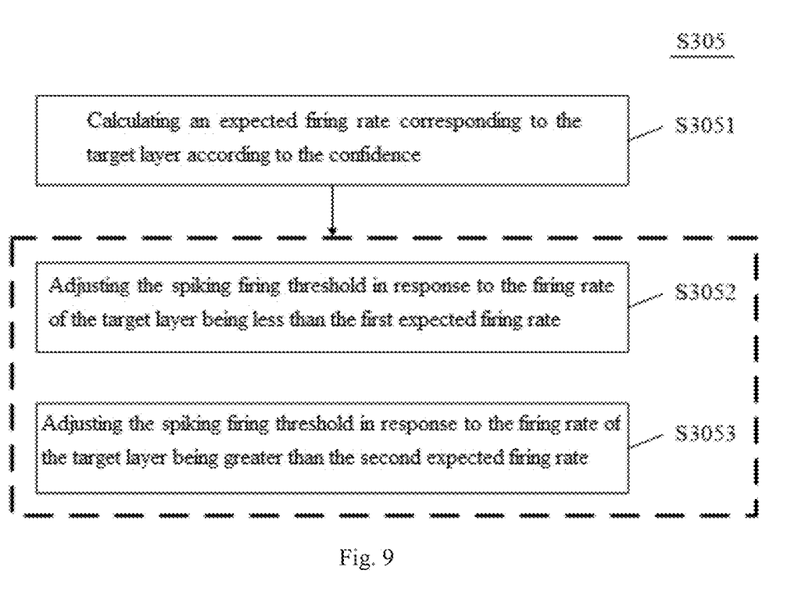
FIG. 9 is a flowchart of another specific implementation method of step S305 according to an embodiment of the present disclosure.

FIG. 9 is a flowchart of another specific implementation method of step S305 according to an embodiment of the present disclosure. As shown in FIG. 9, in some embodiments, in step S305, the operation of adjusting the spiking firing threshold according to a firing rate of the target layer and the confidence may further include the following steps S3051 to S3053.

At step S3051, an expected firing rate corresponding to the target layer is calculated according to the confidence.

The confidence may include a plurality of values including expected maximum confidence and minimum confidence. Accordingly, the expected firing rate includes a first expected firing rate and a second expected firing rate, and the second expected firing rate is greater than the first expected firing rate. The first expected firing rate is associated with the maximum confidence, and the second expected firing rate is associated with the minimum confidence.

In some embodiments, the confidence of the training sample at the target layer reflects an expected spiking firing sparsity. The confidence is associated with the expected firing rate of the target layer. The sum of the confidence and the expected firing rate is equal to 1. Exemplarily, the sum of the first expected firing rate and the maximum confidence is equal to 1, and the sum of the second expected firing rate and the minimum confidence is equal to 1.

At step S3052, the spiking firing threshold is adjusted in response to the firing rate of the target layer being less than the first expected firing rate.

In some embodiments, in step S3052, the operation of adjusting the spiking firing threshold in response to the firing rate being less than the first expected firing rate may further include: adjusting the spiking firing threshold according to the difference between the spiking firing threshold and the preset excitation parameter. For the detailed description of the step of adjusting the spiking firing threshold according to the difference between the spiking firing threshold and the preset excitation parameter, reference may be made to the relevant description of adjusting the spiking firing threshold based on the excitation parameter in steps S3021 to S3026. The detailed descriptions will be omitted herein.

At step S3053, the spiking firing threshold is adjusted in response to the firing rate of the target layer being greater than the second expected firing rate.

In some embodiments, in step S3053, the operation of adjusting the spiking firing threshold in response to the firing rate being greater than the second expected firing rate may further include: adjusting the spiking firing threshold according to the sum of the spiking firing threshold and the preset excitation parameter. For the detailed description of the step of adjusting the spiking firing threshold according to the sum of the spiking firing threshold and the preset excitation parameter, reference may be made to the relevant description of adjusting the spiking firing threshold based on the excitation parameter in steps S3011 to S3016. The detailed descriptions will be omitted herein.

If the firing rate of the target layer is less than the first expected firing rate, it indicates that the spiking firing of the target layer in a current time step is less, the corresponding real-time confidence is greater than the expected maximum confidence, and a current firing threshold value, i.e. the spiking firing threshold, is too high, thereby adjusting the spiking firing threshold so as to increase the spiking firing of the target layer in a subsequent time step. If the firing rate of the target layer is greater than the second expected firing rate, it indicates that the spiking firing of the target layer is excessive, the corresponding real-time confidence is less than the expected minimum confidence, and a current firing threshold value, i.e. the spiking firing threshold, is too low, thereby adjusting the spiking firing threshold to reduce the subsequent spiking firing of the target layer.

The SNN training method provided by the present disclosure is described in detail below in conjunction with practical applications. Specifically, a neuron model of an SNN to be trained adopts an LIF model, and a training sample is subjected to spiking coding in advance so as to generate a spiking signal corresponding to the training sample. The training sample is an image sample, and the corresponding generated spiking signal is an image spiking sequence.

The spiking signal is input into the SNN, and the SNN is trained based on a BP rule. The BP rule is a BPTT rule.

In a forward propagation stage of training, when a time step is t and layer 1 of the SNN is a target layer, the forward propagation stage includes: calculating a membrane potential hidden state of the target layer according to the output of a forward layer of the target layer and updating a membrane potential of the target layer; determining an activation parameter corresponding to the target layer through an activation function according to the updated membrane potential; adjusting a spiking firing threshold corresponding to the target layer according to the activation parameter corresponding to the target layer and confidence corresponding to the target layer; determining spiking firing for the target layer based on the adjusted spiking firing threshold of the target layer; performing a membrane potential leakage step of the target layer; and adjusting a value range of the activation parameter.

The process of adjusting a spiking firing threshold corresponding to the target layer according to the activation parameter corresponding to the target layer and confidence corresponding to the target layer includes: calculating a target adjustment threshold according to the activation parameter and the confidence corresponding to the target layer. The target adjustment threshold includes a first adjustment threshold and a second adjustment threshold. The first adjustment threshold corresponds to expected minimum confidence, the second adjustment threshold corresponds to expected maximum confidence, and the two thresholds are used for characterizing a current expected spiking firing sparsity. Exemplarily, the former corresponds to 85%, and the latter corresponds to 98%. The activation parameter includes a plurality of activation parameter values, which are sorted in descending order. The first adjustment threshold is less than any of the activation parameter values in the first 15% of the sorting result and is greater than the remaining 85% of the activation parameter values, or the first adjustment threshold is equal to the activation parameter value with the minimum value among all the activation parameter values in the first 15% of the sorting result. The second adjustment threshold is less than any of the activation parameter values in the first 2% of the ranking result and is greater than the remaining 98% of the activation parameter values, or the second adjustment threshold is equal to the activation parameter value with the minimum value among all the activation parameter values in the first 2% of the sorting result.

Thereafter, in response to the spiking firing threshold being less than the first adjustment threshold, the spiking firing threshold is adjusted according to a sum of the spiking firing threshold and an excitation parameter until the spiking firing threshold is equal to the first adjustment threshold or the number of adjustments reaches a maximum number of adjustments. Exemplarily, the excitation parameter has a value of 0.01. When the number of adjustments is greater than a preset maximum number of adjustments and the spiking firing threshold is still less than the first adjustment threshold, the adjustment of the spiking firing threshold is also completed. Exemplarily, the maximum number of adjustments has a value of 50.

In response to the spiking firing threshold being greater than the second adjustment threshold, the spiking firing threshold is adjusted according to a difference between the spiking firing threshold and a preset excitation parameter until the spiking firing threshold is equal to the second adjustment threshold or the number of adjustments reaches a maximum number of adjustments. Accordingly, when the number of adjustments is greater than a preset maximum number of adjustments and the spiking firing threshold is still greater than the second adjustment threshold, the adjustment of the spiking firing threshold is also completed. After the adjustment of the spiking firing threshold is completed, the membrane potential leakage step of the target layer is performed, and the value range of the activation parameter is adjusted according to a current value of the activation parameter and the adjusted spiking firing threshold.

Embodiments of the present disclosure also provide an SNN-based data processing method, including: acquiring a spiking signal corresponding to data to be processed; and processing the spiking signal through an SNN, and outputting a processing result. The processing includes: adjusting a spiking firing threshold corresponding to a target layer according to confidence corresponding to the target layer. The SNN is obtained by training based on the SNN training method as in any of the above embodiments.

The data to be processed may be various types of data such as video, image, text or audio data, and the data to be processed and the training sample used in the corresponding SNN training method are the same type of data.

The adjustment of the spiking firing threshold of the target layer during the processing, i.e. the SNN reasoning process, is similar to the training process, i.e. similar to step S3 and other related steps described above. The detailed descriptions will be omitted herein.

In this way, when reasoning through the SNN obtained by training, the spiking firing threshold of the target layer is adjusted according to the confidence of the target layer, so that the sparsity of the target layer can be maintained within a target range, thereby improving the calculation efficiency of the SNN.

Figure 10:
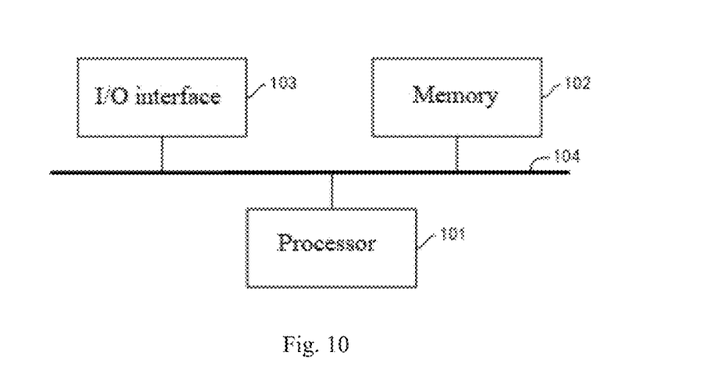
FIG. 10 is a composition block diagram of an electronic device according to an embodiment of the present disclosure.

FIG. 10 is a composition block diagram of an electronic device according to an embodiment of the present disclosure. As shown in FIG. 10, the electronic device includes: one or more processors 101; a memory 102 on which one or more computer instructions are stored, wherein when the one or more computer instructions are executed by the one or more processors, the one or more processors 101 implement the SNN training method as in any of the above embodiments, and/or, implement the SNN-based data processing method as in the above embodiments; and one or more I/O interfaces 103, connected between the processor and the memory, and configured to realize information interaction between the processor and the memory.

The processor 101 is a device having a data processing capability, including but not limited to a central processing unit (CPU), etc. The memory 102 is a device having a data storage capability, including but not limited to a random access memory ((RAM) more specifically such as SDRAM or DDR), a read-only memory (ROM), an electrically erasable programmable read-only memory (EEPROM), and a flash memory (FLASH). The I/O interface (read/write interface) 103 is connected between the processor 101 and the memory 102 to realize information interaction between the processor 101 and the memory 102, including but not limited to a data bus (Bus), etc.

In some embodiments, the processor 101, the memory 102 and the I/O interface 103 are connected to each other and to other components of a computing device through the bus 104.

In some embodiments, the plurality of processors 101 include a plurality of graphics processing units (GPU) arranged in combination to form a GPU array.

Figure 11:
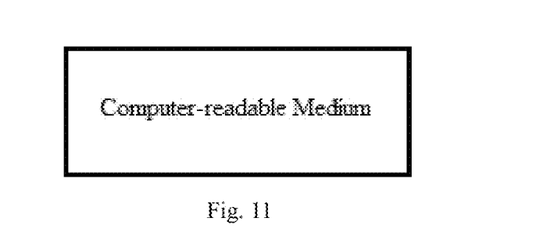
FIG. 11 is a composition block diagram of a computer-readable medium according to an embodiment of the present disclosure.

FIG. 11 is a composition block diagram of a computer-readable medium according to an embodiment of the present disclosure. The computer-readable medium has a computer program stored thereon. The computer program, when executed by a processor, implements the steps in the SNN training method as in any of the above embodiments, and/or, implements the steps in the SNN-based data processing method as in the above embodiments.

It should be understood by those ordinarily skilled in the art that all or some of the steps in the method disclosed above, and the functional modules/units in the system and the apparatus may be implemented as software, firmware, hardware, and a proper combination thereof. In hardware implementations, the division between functional modules/units mentioned in the above description does not necessarily correspond to the division of physical components. For example, a physical component may have multiple functions, or a function or step may be performed collaboratively by several physical components. Some or all of the physical components may be implemented as software executed by a processor, such as a CPU, a digital signal processor, or a microprocessor, or as hardware, or as an integrated circuit, such as an application specific integrated circuit. Such software may be distributed on the computer-readable medium. The computer-readable medium may include a computer storage medium (or non-temporary medium) and a communication medium (or temporary medium). As known to those ordinarily skilled in the art, the term, computer storage medium, includes volatile and nonvolatile, removable and non-removable media implemented in any method or technology for storage of information (such as computer-readable instructions, data structures, program modules or other data). The computer storage medium includes, but is not limited to, a RAM, a ROM, an EEPROM, a flash memory or other memory technologies, a compact disc read-only memory (CD-ROM), a digital video disk (DVD) or other optical disk storage, a cartridge, a tape, a disk storage or other magnetic storage devices, or any other media which may be used for storing expected information and may be accessed by a computer. Furthermore, as known to those ordinarily skilled in the art, the communication medium generally includes computer-readable instructions, data structures, program modules or other data in a modulated data signal such as a carrier wave or other transmission mechanisms, and may include any information delivery media.

Example embodiments have been disclosed herein, and although specific terms are employed, the terms are used and should be interpreted in a generic and descriptive sense only and not for purposes of limitation. In some examples, it will be apparent to those skilled in the art that features, characteristics, and/or elements described in connection with particular embodiments may be used alone or in combination with features, characteristics, and/or elements described in connection with other embodiments, unless explicitly stated otherwise. Accordingly, it will be understood by those skilled in the art that various changes in form and details may be made therein without departing from the scope of the present disclosure as set forth in the appended claims.

The invention claimed is:

1. A method for training spiking neuron network, comprising:
   inputting a spiking signal corresponding to a training sample into a spiking neuron network to be trained; and
   training the spiking neuron network based on a back propagation rule, wherein a forward propagation stage of training comprises: adjusting a spiking firing threshold corresponding to a target layer in the spiking neuron network according to confidence corresponding to the target layer,
   wherein the confidence corresponding to the target layer is associated with an expected spiking firing sparsity of the target layer, and
   wherein a spiking firing sparsity is a ratio of the number of neurons firing spiking in the target layer to the number of all neurons in the target layer;
   wherein before the adjusting a spiking firing threshold corresponding to a target layer in the spiking neuron network according to confidence corresponding to the target layer, the method further comprises:
   calculating an activation parameter corresponding to the target layer according to a membrane potential corresponding to the target layer;
   the adjusting a spiking firing threshold corresponding to a target layer in the spiking neuron network according to confidence corresponding to the target layer comprises:
   calculating a target adjustment threshold according to the activation parameter and the confidence, and adjusting the spiking firing threshold based on the target adjustment threshold.

2. The method according to claim 1, wherein the target adjustment threshold comprises: a first adjustment threshold;
   the calculating a target adjustment threshold according to the activation parameter and the confidence and adjusting the spiking firing threshold based on the target adjustment threshold comprises:
   adjusting the spiking firing threshold in response to the spiking firing threshold being less than the first adjustment threshold.

3. The method according to claim 2, wherein the adjusting the spiking firing threshold in response to the spiking firing threshold being less than the first adjustment threshold comprises:
   adjusting the spiking firing threshold according to a sum of the spiking firing threshold and a preset excitation parameter to determine a current spiking firing threshold;
   if the current spiking firing threshold is greater than or equal to the first adjustment threshold, determining the current spiking firing threshold as a finally adjusted spiking firing threshold;
   if the current spiking firing threshold is less than the first adjustment threshold and the number of currently accumulated adjustments is equal to a maximum number of adjustments, determining the current spiking firing threshold as a finally adjusted spiking firing threshold; and
   if the current spiking firing threshold is less than the first adjustment threshold and the number of currently accumulated adjustments is less than the maximum number of adjustments, re-performing the step of adjusting the spiking firing threshold according to a sum of the spiking firing threshold and a preset excitation parameter.

4. The method according to claim 2, wherein the target adjustment threshold further comprises: a second adjustment threshold;
   the calculating a target adjustment threshold according to the activation parameter and the confidence and adjusting the spiking firing threshold based on the target adjustment threshold further comprises:
   adjusting the spiking firing threshold in response to the spiking firing threshold being greater than the second adjustment threshold, the second adjustment threshold being greater than the first adjustment threshold.

5. The method according to claim 4, wherein the adjusting the spiking firing threshold in response to the spiking firing threshold being greater than the second adjustment threshold comprises:
   adjusting the spiking firing threshold according to a difference between the spiking firing threshold and the preset excitation parameter to determine a current spiking firing threshold;
   if the current spiking firing threshold is less than or equal to the second adjustment threshold, determining the current spiking firing threshold as a finally adjusted spiking firing threshold;
   if the current spiking firing threshold is greater than the second adjustment threshold and the number of currently accumulated adjustments is equal to a maximum number of adjustments, determining the current spiking firing threshold as a finally adjusted spiking firing threshold; and
   if the current spiking firing threshold is greater than the second adjustment threshold and the number of currently accumulated adjustments is less than the maximum number of adjustments, re-performing the step of adjusting the spiking firing threshold according to a difference between the spiking firing threshold and the preset excitation parameter.

6. The method according to claim 1, wherein after the adjusting a spiking firing threshold corresponding to a target layer in the spiking neuron network according to confidence corresponding to the target layer, the method further comprises:

performing spiking firing of the target layer in response to the activation parameter being greater than or equal to the adjusted spiking firing threshold.

7. A method for training spiking neuron network, comprising:

inputting a spiking signal corresponding to a training sample into a spiking neuron network to be trained; and training the spiking neuron network based on a back propagation rule, wherein a forward propagation stage of training comprises: adjusting a spiking firing threshold corresponding to a target layer in the spiking neuron network according to confidence corresponding to the target layer, wherein the confidence corresponding to the target layer is associated with an expected spiking firing sparsity of the target layer, and wherein a spiking firing sparsity is a ratio of the number of neurons firing spiking in the target layer to the number of all neurons in the target layer, wherein the adjusting a spiking firing threshold corresponding to a target layer in the spiking neuron network according to confidence corresponding to the target layer comprises:

calculating an activation parameter corresponding to the target layer according to a membrane potential corresponding to the target layer;

performing spiking firing in response to the activation parameter being greater than or equal to the spiking firing threshold; and adjusting the spiking firing threshold according to a firing rate of the target layer and the confidence.

8. The method according to claim 7, wherein the adjusting the spiking firing threshold according to a firing rate of the target layer and the confidence comprises:

calculating an expected firing rate corresponding to the target layer according to the confidence, the expected firing rate comprising a first expected firing rate and a second expected firing rate, the second expected firing rate being greater than the first expected firing rate; and adjusting the spiking firing threshold in response to the firing rate being less than the first expected firing rate; or, adjusting the spiking firing threshold in response to the firing rate being greater than the second expected firing rate.

9. The method according to claim 8, wherein the adjusting the spiking firing threshold in response to the firing rate being less than the first expected firing rate comprises: adjusting the spiking firing threshold according to the difference between the spiking firing threshold and the preset excitation parameter; and the adjusting the spiking firing threshold in response to the firing rate being greater than the second expected firing rate comprises: adjusting the spiking firing threshold according to the sum of the spiking firing threshold and the preset excitation parameter.

10. A method for training spiking neuron network, comprising:

inputting a spiking signal corresponding to a training sample into a spiking neuron network to be trained; and training the spiking neuron network based on a back propagation rule, wherein a forward propagation stage of training comprises: adjusting a spiking firing threshold corresponding to a target layer in the spiking neuron network according to confidence corresponding to the target layer, wherein the confidence corresponding to the target layer is associated with an expected spiking firing sparsity of the target layer, and wherein a spiking firing sparsity is a ratio of the number of neurons firing spiking in the target layer to the number of all neurons in the target layer;

wherein before the adjusting a spiking firing threshold corresponding to a target layer in the spiking neuron network according to confidence corresponding to the target layer, the method further comprises: calculating an activation parameter corresponding to the target layer according to a membrane potential corresponding to the target layer;

the adjusting a spiking firing threshold corresponding to a target layer in the spiking neuron network according to confidence corresponding to the target layer comprises:

determining an average activation parameter according to the activation parameter corresponding to the target layer; and adjusting the spiking firing threshold according to the average activation parameter and the confidence.

11. The method according to claim 1, wherein the spiking signal corresponding to the training sample comprises: one of an image spiking sequence corresponding to an image sample, an audio spiking sequence corresponding to an audio sample, and a text spiking sequence corresponding to a text sample.

12. A method for processing data based on a spiking neuron network method, comprising:

acquiring a spiking signal corresponding to data to be processed; and processing the spiking signal through a spiking neuron network, and outputting a processing result, wherein the processing comprises: adjusting a spiking firing threshold corresponding to a target layer in the spiking neuron network according to confidence corresponding to the target layer, the spiking neuron network being obtained by training based on the method for training spiking neuron network according to claim 1.

13. An electronic device, comprising:

one or more processors; and a memory configured to store one or more computer instructions, wherein when the one or more computer instructions are executed by the one or more processors, the one or more processors implement the method for training spiking neuron network according to claim 1.

14. A non-transitory computer-readable medium having a computer program stored thereon, wherein the computer program, when executed by a processor, implements the steps in the method for training spiking neuron network according to claim 1.

15. An electronic device, comprising: one or more processors; and a memory configured to store one or more computer instructions, wherein when the one or more computer instructions are executed by the one or more processors, the one or more processors implement the method for processing data according to claim 12.

16. A non-transitory computer-readable medium having a computer program stored thereon, wherein the computer program, when executed by a processor, implements the steps in the method for processing data according to claim 12.

* * * * *